UNITED STATES PATENT OFFICE.

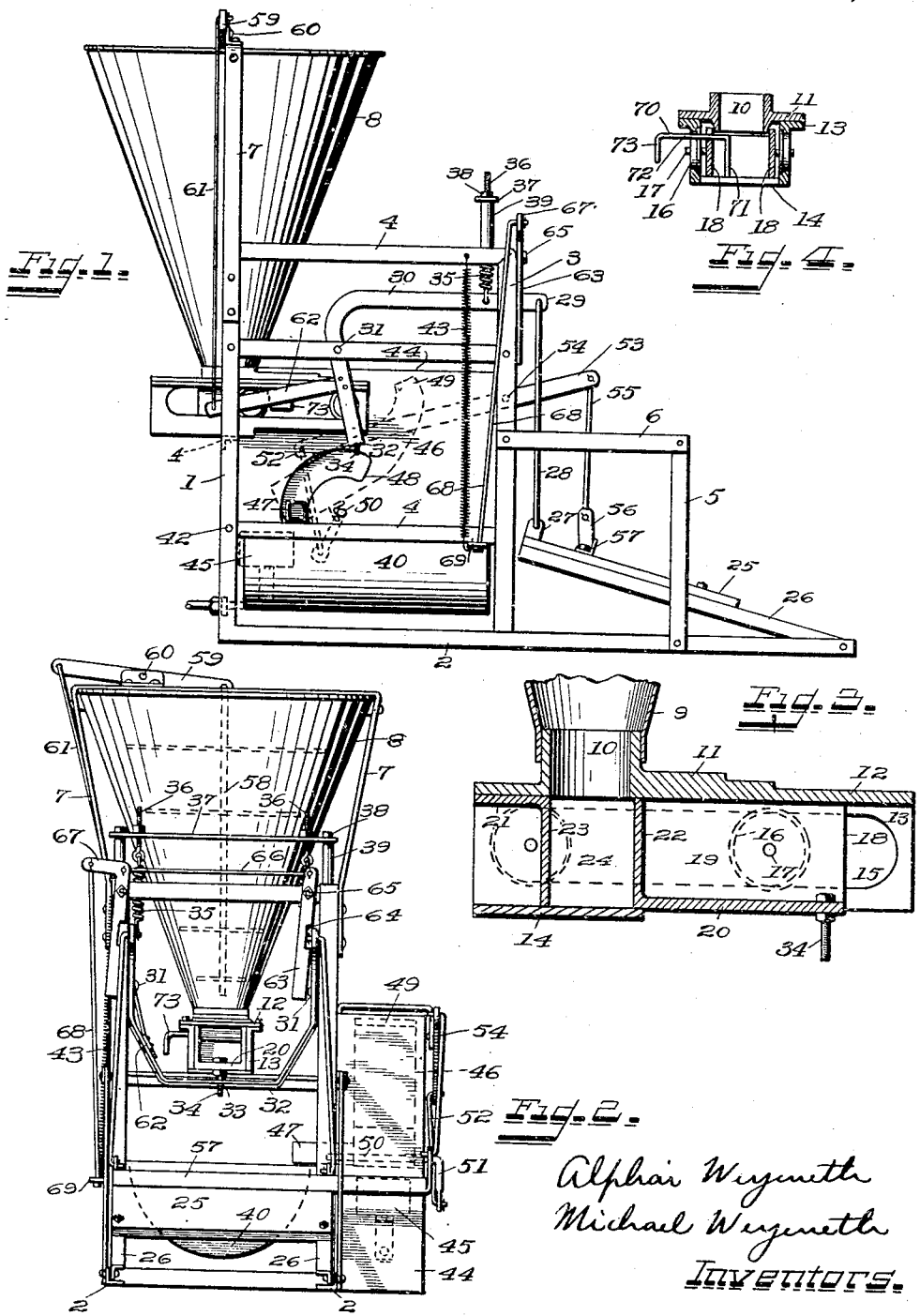

ALPHAI WEYENETH AND MICHAEL WEYENETH, OF ROANOKE, ILLINOIS.

ANIMAL-FEEDING DEVICE.

1,258,069.

Specification of Letters Patent.

Patented Mar. 5, 1918.

Application filed August 7, 1915. Serial No. 44,184.

*To all whom it may concern:*

Be it known that we, ALPHAI WEYENETH and MICHAEL WEYENETH, citizens of the United States, residents of Roanoke, in the county of Woodford and State of Illinois, have invented new and useful Improvements in Animal-Feeding Devices, of which the following is a specification.

Our invention relates to improvements in animal feeding devices and the principal object of this invention is the provision of such a mechanism for supplying feed to stock in limited quantities, so as to prevent waste of the same, the device being operated by the animal.

A further object is the provision of such a mechanism in which a determined quantity of feed is discharged into the feeding trough through mechanism operated by the weight of the animal.

A further object is the provision of means for providing either wet or dry feed for the animal.

Another object of our invention is the provision of means for preventing the operation of the device to supply additional feed when the amount of feed in the trough has reached a predetermined weight.

A further object of the invention is the provision of a valve mechanism for supplying material in limited and determined quantities to the feeding trough, the valve mechanism being operated by the weight of the animal and being discharged so as to vary the amount discharged at each operation.

Another object is the provision in connection with the means for supplying the feed to the feeding trough, of a water supply and connections for discharging the limited quantities of water to the feeding trough, this means also being actuated by the animal.

Further objects include the improvement in details of construction and arrangement, whereby a simple and efficiently operating device of this character is provided.

To the accomplishment of the foregoing and such other objects as may hereinafter appear, our invention consists in the combination, construction and arrangement of parts hereinafter described, and then sought to be defined in the appended claims, reference being had to the accompanying drawings forming a part hereof, and which show merely for the purpose of illustrative disclosure, a preferred embodiment of my invention, it being understood that various changes may be made in practice within the scope of the claims, without digressing from my inventive idea.

In the drawings:—

Figure 1 represents a side elevation of a mechanism constructed according to our invention;

Fig. 2 represents an end elevation of a device constructed according to our invention;

Fig. 3 is a vertical section on a somewhat enlarged scale, of the valve mechanism, which supplies the feed in limited quantities from the hopper to the feeding trough; and Fig. 4 is a transverse section of the valve mechanism, showing the means for adjusting the size of the recess or compartment therein, which contains the charge of feed.

This mechanism includes essentially, a hopper for containing the feed, a valve mechanism for discharging the feed from said hopper into a feeding trough in limited quantities, a tank for containing a supply of liquid and having means for discharging determined quantities of the liquid into said feeding trough and operating means actuated by the weight of the animal, having connections with said valve mechanism and connections with said liquid supply tank, so that the discharge of the feed and water into the feeding trough is controlled by the animal.

Referring now to the drawings, the numeral 1 designates the frame or support which comprises the base members 2, the vertical members 3 having the end and transverse members 4 for supporting the various parts of the mechanism. This frame is preferably constructed of angle iron. The base members 2 are extended beyond the vertical members 3 and have connected thereto, the vertical members 5 and horizontal members 6 to form a guide-way or run-way for the animals.

Supported at the rear of the frame on the upwardly extending members 7 is the hopper 8 which is adapted to contain a supply of the feed, this hopper having its discharge opening restricted as at 9 so as to register with the opening 10 in the feed box 11, which is located at the rear of the frame and rests on one of the transverse members 4. This feed box is substantially rectangular in shape and comprises the top portion 12 which has the above mentioned opening 10, the side members 13 and the bottom member 14. The side members are provided with the runways 15 for the wheels or pulleys 16, which are mounted on short shafts 17 connected to the side members 18 of the valve proper 19, which valve proper includes said side members 18, the bottom member 20 in its forward portion, the top member 21 in its rear portion and the intermediate partitions 22 and 23 which provide a charge receiving compartment or recess 24 which is closed in one position by the bottom member 14 of the feed box and in the other position by the top member 12 of the feed box. When in its latter position, it is open, so as to discharge the feed into the feeding box or trough to be described later.

It is obvious from this description and from the consideration of this figure, that in the position shown in Fig. 3, the charge receiving recess or compartment will receive a quantity of feed from the hopper and when the valve 19 is moved to the right, referring to said Fig. 3, said charge of feed will be discharged into the feeding trough.

The means for operating this valve will now be described, it being understood as stated hereinbefore, that this operating means is actuated by the weight of the animal. Pivotally secured to the extended base members 2, is the platform 25 which comprises the side members 26 having the platform secured thereon. To the end of this platform are secured the apertured ears 27 which pivotally receive one end of links 28, the other ends of said links being pivoted in the apertured ends 29 of the bell crank levers or arms 30, one of which is positioned at each side of the frame and is pivoted at 31 to one of the frame members 4. These bell crank members extend downwardly to a position beneath the feed-box and have these ends joined by the strap or U-shaped portion 32 which is apertured as at 33 to receive the bolt 34, which bolt is secured to the bottom member 20 of the valve mechanism. As shown, these bell crank levers are formed of a single piece of material, being bent into the shape disclosed. The parts are normally held in a position, shown in Fig. 1 by means the spring 35 which is secured to the horizontal portion of one of the bell crank levers and is connected to the adjustable bolt 36, secured to the horizontal member 37, which is positioned above the frame by means of the bolts 38 and spacing sleeves 39. It is therefore seen that when the animal steps upon the platform 25, the horizontal portions of the bell crank levers will be drawn downwardly, rocking the levers on their pivots 31 and moving the valve toward the rear of the machine, that is to the left, to the position shown in Fig. 3.

In this position, a charge of feed will be supplied to the charge receiving recess or compartment and when the animal steps off of the platform, the spring 35 will cause the parts to return to their normal position, shown in Fig. 1, when the charge of feed will be dropped into the feeding trough, so that if the same animal or another animal steps upon the platform, he will find a quantity of feed in the trough and will move the valve again to the position shown in Fig. 3.

The feeding trough previously referred to, is designated by the reference character 40 and is positioned at the lower part of the frame 1, being pivotally mounted as at 42 and held in its normal position by means of spring 43 which is connected to the front end thereof and also to one of the upper members 4 of the frame. The purpose of this pivotal and resilient mounting of the feeding trough will be described presently.

To one side of the frame we provide the tank or receptacle 44 which is adapted to receive a supply of water or other liquid, this supply being controlled by an ordinary form of float 45. A dipper member 46 is mounted in this tank or receptacle and is provided with the discharge spout 47 which is adapted to move in the circular recess or opening 48 formed in the side wall of the tank or receptacle. The dipper member is of elongated and curved shape, having its rear end opening at 49 so that it will receive a quantity of liquid when the rear end 49 is depressed into the tank or receptacle. This dipper member is supported on the shaft 50, which is journaled in the sides of the tank and has the crank arm 51, which crank arm 51 is connected by means of link 52 to an arm or bar 53 which is pivoted to an extension of the frame at 54 and has an operating link 55 pivotally secured to its end and extending downwardly to an apertured ear 56 on the end of an angle iron bar member 57 which is secured to the platform. When the platform is depressed, the lever 53 will be moved on its pivot 54 turning the crank, and also the dipper member 46, thereby permitting a quantity of liquid to pass into the dipper member through the open end 49 and when the animal moves off of the platform and the parts return to their normal position, the lever 53 will be moved in an opposite direction, moving the dipper member to the position shown in Fig. 1, so that the liquid contained therein, will be discharged through the spout 47 into the trough 40, so that the liquid will be mixed with the dry feed, making a wet feed or "slop."

We also provide in connection with this mechanism, an agitating means in the hopper which includes the agitator 58 connected to the lever 59 pivoted at 60 and having the link connection 61 with the arm 62, which arm extends rearwardly from one of the bell crank levers 30, so that as the bell crank lever is moved to and from its different positions, the agitator will be reciprocated in a vertical direction.

It is desirable in mechanisms of this character, in order to prevent waste of the feed and overfeeding of the animals, to provide means for preventing the operation, should the quantity of feed in the feeding trough exceed a predetermined amount and for this purpose, we provide the pair of locking arms 63 having the notches 64 which are positioned in line with the horizontal members of the bell crank levers 30. These locking arms 63 are pivoted to one of the members 4 of the frame as at 65 and are connected to operate in unison, by means of the link 66. One of the arms has the laterally extending lug or ear 67 which has the link connection 68 with an apertured lug 69 on the front end of the feeding trough. It is therefore seen that when a sufficient quantity of feed and liquid is supplied to the feeding trough, that it will overcome the tension of the spring 43 and move the trough on its pivot 42, drawing link 68 and moving the locking arms 63 to the right, that is, looking at Fig. 2, whereby the notches 64 in said arm 63, embrace the horizontal portions of the bell crank levers 30 and prevent their actuation by the animal and consequently, preventing the supply of any more feed or liquid to the feeding trough.

It is also desirable to vary the quantity of each charge of feed supplied to the feeding trough, depending on the kind of feed used and other working conditions, and for this purpose, we utilize the adjustable member 70, shown in detail in Fig. 4, which includes the movable partition 71, the horizontal portion 72 and the operating flange or portion 73. By providing this means, the size of the charge receiving recess or compartment in the valve, may be varied as desired and thus, the quantity of each charge of feed, readily controlled.

What we claim is:—

1. A mechanism of the character described, including in combination, a hopper, a trough, means for controlling the feed of material in determined quantities from said hopper to said trough, operating means for said feeding means, adapted to be actuated by the weight of animals, and including a pair of operating arms pivotally mounted and having connection with said feeding means, an agitator mounted in said hopper, and having connection with said operating arms.

2. A mechanism of the character described including in combination, a hopper, a trough, means for feeding material in determined quantities to said trough, means for operating said feeding means controlled by the weight of an animal, means for preventing the movement of said operating means when the quantity of the material in the trough exceeds a predetermined amount.

3. A mechanism of the character described, including in combination, a hopper, a trough, means for feeding material to said trough in determined quantities, means for operating said feeding means controlled by the weight of an animal, and means for supplying water to said trough.

4. A mechanism of the character described, including in combination, a hopper, a trough, means for feeding material to said trough in determined quantities, means for operating said feeding means controlled by the weight of an animal, means for supplying water to said trough, said water supplying means having connection with said feed operating means.

5. A mechanism of the character described, including in combination, a frame or support having a hopper mounted therein, a trough mounted below said hopper, a feeding mechanism connected to said hopper and adapted to supply feed in limited quantities from said trough to said hopper, a platform secured to said frame, connections between said platform and said feeding mechanism, said platform being adapted to be depressed by the weight of animals so as to actuate said feeding mechanism and control the discharge of feed from said hopper to said trough, said feeding mechanism including a valve member having a charge receiving recess or compartment therein, adapted to receive a charge of material from said hopper and to discharge said charge into said trough.

6. In a mechanism of the character described and in combination, a frame or support, a hopper mounted thereon, a feeding trough secured thereto, a feeding mechanism for discharging the feed in limited quantities from said hopper and to said feeding trough, said feeding mechanism including a valve member, an operating platform adapted to be depressed by the weight of animals, connections between said platform and said valve so that the movement of the platform will operate the valve member, said connections including a pair of bell crank levers, having a member connecting them, positioned beneath said valve member and connections between said member and said valve member.

7. In a mechanism of the character described and in combination, a frame or support, a hopper, a feeding trough pivotally mounted, a feeding mechanism for supplying feed in limited quantities from said hopper to said trough, an operating platform, connections between said platform and said feeding mechanism, and locking means controlled by said feeding trough for preventing the operation of said feeding mechanism when the quantity of feed in the trough exceeds a predetermined quantity.

8. In a mechanism of the character described and in combination, a frame or support, a hopper, a feeding trough pivotally mounted, a feeding mechanism for supplying feed in limited quantities from said hopper to said trough, an operating platform, connections between said platform and said feeding mechanism, and locking means controlled by said feeding trough for preventing the operation of said feeding mechanism when the quantity of feed in the trough exceeds a predetermined quantity, said locking means including a lever arm, having a notch adapted to engage said connections and a connection between said locking arm and said trough.

9. A mechanism of the character described and in combination, a frame or support, a hopper, a feeding trough pivotally mounted in said hopper and adapted to be depressed when the quantity of feed therein exceeds a predetermined amount, a feeding mechanism for supplying feed in limited quantities to said feeding trough, an operating platform, connections between said operating platform and said feeding mechanism including a pair of bell crank levers, locking means for preventing the operation of said feeding means controlled by said feeding trough and including a pair of locking arms, each having a notch adapted to engage said bell crank levers, said locking arms being pivoted to said frame or support and having a connection with said feeding trough so that when an excess quantity of feed is supplied to the feeding trough, the locking arm will be moved to engage the bell crank lever and prevent the operation of the feeding mechanism.

10. In a mechanism of the character described and in combination, a frame or support, a hopper, a feeding trough, a feeding mechanism for supplying feed in limited quantities from said hopper to said trough, means for actuating said feeding means operated by the weight of animals, an agitator in the hopper and connections between said agitator and said operating means so that when the feeding means is operated, the agitator will be actuated.

11. In a mechanism of the character described, and in combination, a frame or support, a hopper, a feeding trough, a feeding mechanism adapted to supply feed in limited quantities from said hopper to said trough, a liquid container, a dipper member pivotally mounted in said liquid container and adapted to discharge into said feeding trough, operating means actuated by the weight of animals for operating said feeding means and for tilting said dipper so as to supply quantities of feed and liquid to said feeding trough.

12. In a mechanism of the character described, and in combination, a frame or support, a hopper, a feeding trough, a feeding mechanism adapted to supply feed in limited quantities from said hopper to said trough, a liquid container, a dipper member pivotally mounted in said liquid container and adapted to discharge into said feeding trough, a platform pivotally mounted on said frame or support and adapted to be depressed by the weight of animals, connections between said platform and said feeding mechanism and connections between said platform and said dipper member, whereby when the platform is actuated, said feeding mechanism and said dipper member will be operated.

13. A mechanism of the character described, including in combination, a frame, a hopper, a trough in the lower portion of the frame, means for transferring material in determined quantities from said hopper to said trough, a pair of operating arms pivotally mounted on each side of said frame and connected to said transferring means, and connections with such operating arms for actuating the same by the weight of an animal, said operating arms being in the form of bell crank levers having their vertical portions connected to said transferring means, and locking means adapted to engage their horizontal portions when an excess quantity of material is supplied to said trough to prevent further movement thereof.

14. A mechanism of the character described, including in combination, a frame, a hopper, a trough, means for transferring material in determined quantities from said hopper to said trough, operating means for said transferring means actuated by the weight of an animal, a vertically movable agitator in said hopper and connections between said agitator and said operating means.

15. A mechanism of the character described, including in combination, a frame, a hopper, a trough, means for transferring material in determined quantities from said hopper to said trough, operating means for actuating said transferring means, a platform connected to said operating means and adapted to be depressed by the weight of an animal thereon, and means for returning the said platform to its normal position.

16. A mechanism of the character described including in combination, a frame, a hopper, a trough, means for transferring material in determined quantities from said hopper to said trough, operating means for said transferring means including a platform adapted to be depressed by the weight of an animal, means for returning the platform to its normal position, said operating means being so connected to said transferring means that when the platform is depressed by the weight of an animal, the transferring means will receive a charge of material and when the platform is returned to its normal position, the transferring means will discharge the charge of material into said trough.

ALPHAI WEYENETH.
MICHAEL WEYENETH.

Copies of this patent may be obtained for five cents each, by addressing the "Commissioner of Patents, Washington, D. C."